(12) United States Patent
Takahashi et al.

(10) Patent No.: US 10,151,302 B2
(45) Date of Patent: Dec. 11, 2018

(54) COMPACT WIND POWER GENERATION SYSTEM

(71) Applicants: Timothy T. Takahashi, Phoenix, AZ (US); Calahan B. Campton, Royal Oak, MI (US); Donald L. Wood, Phoenix, AZ (US)

(72) Inventors: Timothy T. Takahashi, Phoenix, AZ (US); Calahan B. Campton, Royal Oak, MI (US); Donald L. Wood, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 396 days.

(21) Appl. No.: 15/043,822

(22) Filed: Feb. 15, 2016

(65) Prior Publication Data

US 2016/0169193 A1 Jun. 16, 2016

Related U.S. Application Data

(63) Continuation of application No. PCT/US2014/054884, filed on Sep. 10, 2014.
(Continued)

(51) Int. Cl.
*F03D 1/04* (2006.01)
*F03D 9/00* (2016.01)
(Continued)

(52) U.S. Cl.
CPC .............. *F03D 15/10* (2016.05); *F03D 9/25* (2016.05); *F03D 13/20* (2016.05); *F03D 80/70* (2016.05); *F03D 9/11* (2016.05); *F05B 2240/13* (2013.01); *F05B 2260/402* (2013.01); *F05B 2260/4021* (2013.01); *Y02E 10/721* (2013.01)

(58) Field of Classification Search
CPC ........ F03D 1/04; F03D 9/002; F05B 2240/13; F05B 2260/402; F05B 2260/4021; Y02E 10/721
See application file for complete search history.

(56) References Cited

U.S. PATENT DOCUMENTS

| 299,127 A | * | 5/1884 | Garrigus | .................. F03D 1/04 415/145 |
| 4,321,476 A | | 3/1982 | Buels | |

(Continued)

OTHER PUBLICATIONS

International Search Report and Written Opinion for International Application No. PCT/US2014/054884 dated Sep. 10, 2014.
(Continued)

*Primary Examiner* — Igor Kershteyn
(74) *Attorney, Agent, or Firm* — Snell & Wilmer L.L.P.

(57) ABSTRACT

Exemplary compact wind power generation systems are configured to be suitable for residential and other locations where concealed moving parts are desirable. The wind power generation systems utilize a propeller disposed behind a contracting inlet. The propeller blades may be oriented "into the wind" to develop consistent torque across a variety of wind speeds. The propeller may rim-drive power generation components, further reducing vibration, or may share a common rotational axis with the power generation components.

18 Claims, 9 Drawing Sheets

Related U.S. Application Data

(60) Provisional application No. 61/876,626, filed on Sep. 11, 2013.

(51) Int. Cl.
  *F03D 15/10* (2016.01)
  *F03D 80/70* (2016.01)
  *F03D 13/20* (2016.01)
  *F03D 9/25* (2016.01)
  *F03D 9/11* (2016.01)

(56) References Cited

U.S. PATENT DOCUMENTS

| | | | |
|---|---|---|---|
| 4,324,985 A | 4/1982 | Oman | |
| 4,398,096 A * | 8/1983 | Faurholtz | F03D 1/04 290/55 |
| 4,508,973 A * | 4/1985 | Payne | F03D 1/04 290/55 |
| 4,963,761 A | 10/1990 | Wight | |
| 5,680,032 A * | 10/1997 | Pena | B60K 6/105 290/52 |
| 5,998,882 A * | 12/1999 | Alston | F03D 3/04 290/54 |
| 6,717,285 B2 * | 4/2004 | Ferraro | F03D 1/04 244/53 B |
| 6,962,478 B2 | 11/2005 | Tsipov | |
| 6,984,899 B1 | 1/2006 | Rice | |
| 7,112,034 B2 * | 9/2006 | Bezemer | F03D 3/04 415/3.1 |
| 7,255,527 B2 | 8/2007 | Hsu | |
| 7,488,150 B2 | 2/2009 | Krippene | |
| 7,753,644 B2 | 7/2010 | Krippene | |
| 8,403,623 B2 | 3/2013 | Krippene | |
| 8,459,930 B2 | 6/2013 | Krippene | |
| 2007/0126240 A1 * | 6/2007 | Richards | F03D 3/002 290/55 |
| 2011/0031760 A1 | 2/2011 | Lugg | |
| 2011/0037261 A1 * | 2/2011 | Champ | F03D 3/005 290/44 |
| 2011/0175366 A1 | 7/2011 | Steinlechner | |

OTHER PUBLICATIONS

Watson SJ et al., "Modelling of the Performance of a Building-Mounted Ducted Wind Turbine" Journal of Physics: Conference Series 75 012001 (2007).

Lilley GM et al.,"A Preliminary Report on The Design and Performance of Ducted Windmills", The College of Aeronautics Cranfield, Report No. 102 (1956).

* cited by examiner

Prior Art

COMPACT WIND POWER GENERATION SYSTEM

CROSS-REFERENCE TO RELATED APPLICATIONS

This application is a continuation of PCT Application No. PCT/US2014/054884 filed on Sep. 10, 2014 and entitled "COMPACT WIND POWER GENERATION SYSTEM". PCT Application No. PCT/US2014/054884 claims priority to, and the benefit of, U.S. Provisional Application Ser. No. 61/876,626 filed on Sep. 11, 2013 and entitled "COMPACT WIND POWER GENERATION SYSTEM". Each of the above applications is hereby incorporated by reference in their entirety.

TECHNICAL FIELD

The present disclosure relates to electrical power generation, and in particular to electrical power generation using wind energy.

BACKGROUND

Energy generation from natural, non-polluting sources continues to increase in importance as global demand for energy increases. However, large, efficient wind power generation systems are often poorly suited for deployment in urban, residential, or other areas, for example due to space constraints, aesthetic objections, and the like. Accordingly, improved wind power generation systems remain desirable.

SUMMARY

In an exemplary embodiment, a wind power generation system comprises an enclosure configured with an airflow inlet and an airflow exit. The airflow inlet is configured with a contraction ratio of at least 5:1. The system further comprises a propeller disposed between the airflow inlet and the airflow exit. The propeller is configured to extract mechanical energy from airflow captured by the inlet. The airflow exit is configured to vent air which has passed over the propeller out of the enclosure.

In another exemplary embodiment, a wind power generation system comprises an inlet comprising a leading edge at a first end of the inlet; a propeller; an adapter connected between a first side of the propeller and a second end of the inlet; and an exit plenum connected to a second side of the propeller. The wind power generation system is configured with a contraction ratio, as measured between the first end of the inlet and the first side of the propeller, of at least 5:1.

The contents of this summary section are provided only as a simplified introduction to the disclosure, and are not intended to be used to limit the scope of the appended claims.

BRIEF DESCRIPTION OF THE DRAWINGS

With reference to the following description and accompanying drawings.

DETAILED DESCRIPTION

Figure 1:
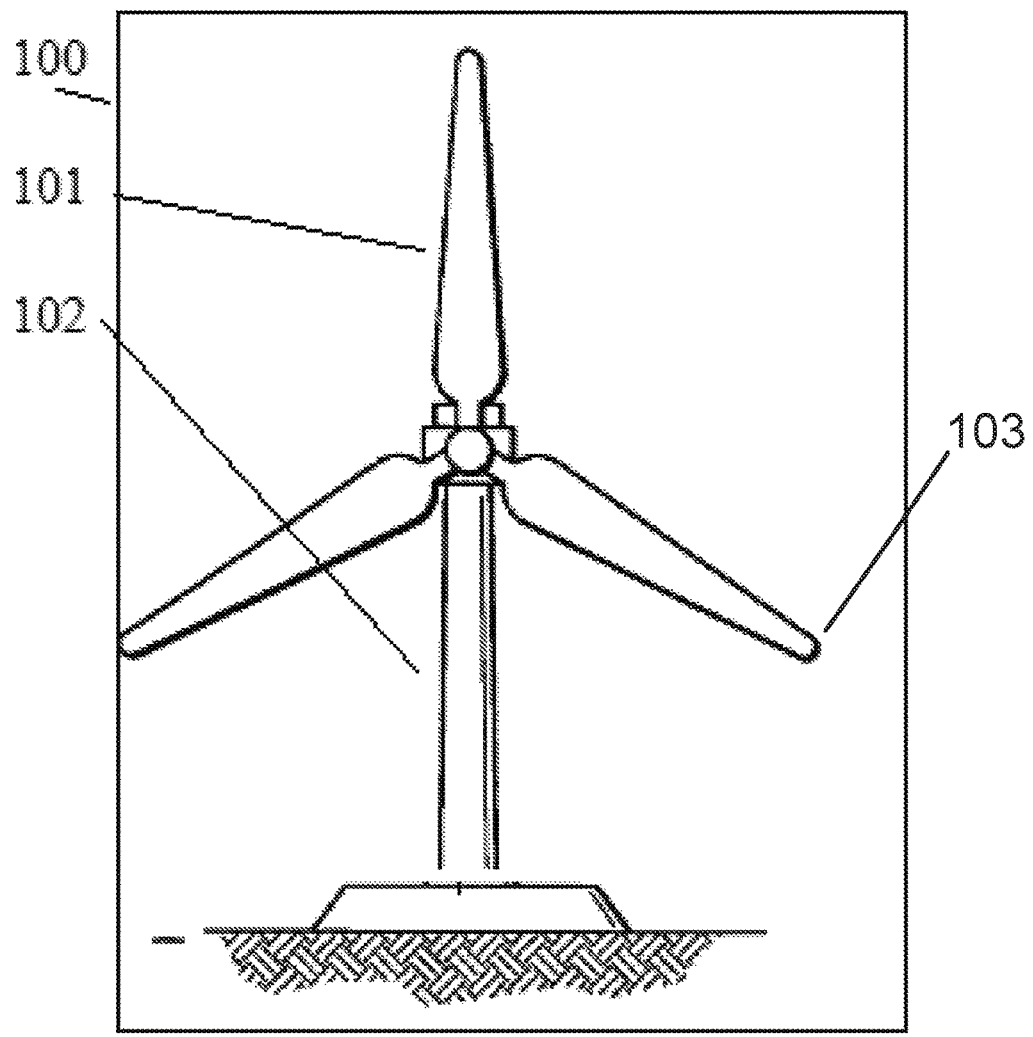
FIG. 1 illustrates a conventional wind power turbine as known in the art.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the present disclosure.

For the sake of brevity, conventional techniques for mechanical power generation, propeller design, venturi design, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical wind power generation system.

In recent years, attention has been given to developing electrical energy from natural, non-polluting sources. Large, efficient wind turbine systems have been developed to capture and transform the kinetic energy of the wind into electrical power. However, it is widely known that a high efficiency wind turbine requires the airflow to pass over the blades at high Reynolds number conditions. While this flow characteristic is easy to obtain in a large wind turbine, it has proven difficult and/or not feasible to obtain in small conventionally configured wind turbines, for example those sized small enough for residential mounting.

In contrast, principles of the present disclosure contemplate a compact residential wind power electrical generation system. In various exemplary embodiments, a wind power generation system configured in accordance with principles of the present disclosure comprises a blunt-leading-edge contracting inlet section, a turbo-propeller of unique design, and a diffusing exit plenum which re-entrains the airflow that has passed through the turbo-propeller into the downstream prevailing wind. Because the contracting inlet section exploits the venturi effect and isentropically accelerates the velocity of the airflow, the airflow over the turbine blades occurs at a unit Reynolds number that is approximately an order of magnitude higher than present in the freestream airflow. This allows a novel turbo-propeller to be configured to operate at efficient, high Reynolds number conditions. Since the turbo-propeller is mounted behind an inlet and ahead of a diffusing exit plenum, all moving parts are concealed from the external observer. This allows the working elements of various exemplary embodiments to be contained within an enclosure that offers pleasing aesthetic and mounting options suitable for residential mounting. Additionally, the moving parts are protected from unintentional contact with foreign object debris, birds or curious human hands.

Ancient society developed the wind mill to generate useful power, harnessing the wind to provide rotational mechanical energy to drive machinery. In more recent years, a considerable number of patents disclose novel configurations for wind power generation. The kinetic energy contained in a unit cross-section area of wind is a function of the density of air and its velocity. Because air is approximately 750 times less dense than water, a water mill can extract 750 times as much energy as a wind mill from an equivalent freestream flow velocity per unit capture area. Consequently, compared to hydro-electrical systems, an equivalently efficient wind powered electrical power generator would utilize 750 times the capture area of an equivalent water mill. Consequently, wind mills are devices that entrain a large cross-section of airflow compared to the power they extract.

A typical modern wind power turbine system 100 is shown in FIG. 1. Such a turbine comprises an externally mounted turbo-propeller 101 mounted atop a structure 102. In such a design, a control system is utilized to orient the propeller 101 into the wind. Typical modern wind power turbines incorporate the electrical power generator directly behind the rotating propeller 101. In such a system, propeller 101 is overhung, and cantilevered out in front of the mechanical bearings. This configuration tends to amplify cyclical loads upon structure 102. Because the electrical generator is mechanically coupled to the propeller 101, electrical power transmission must be made over flexible conduits. Although the momentum efficiency of a large wind turbine is high, these factors add maintenance and operational complexity to a seemingly simple design. Conversely, unconventional wind power turbine designs have seen little commercial success, often due to overly complicated or complex structures.

Most wind powered generators may be grouped into one of two categories in terms of the aerodynamic mechanism used to capture the wind's energy and drive the electrical generator. The first category comprises propeller type designs (e.g., propeller 101 in FIG. 1). Wind turbo-propellers typically have a blade or blades that rotate about an axis generally aligned into the oncoming wind direction.

These blades typically feature a classical airfoil shape, with a blunt leading and sharp trailing edge. Each blade is twisted to locally tilt into the wind. In order to generate power, the blades rotate at a considerable speed, so that the local velocity of turbo-propeller blade near the tip (e.g., tip 103 in FIG. 1) is dominated by the radial velocity of the spinning blade rather than the axial velocity of the oncoming flow. The blades are oriented so that as the wind flows over the blades, the airfoil section produces lift and drag. Ideally, the blades are oriented so that the airfoil section operates at its most efficient lift-to-drag-ratio condition. The vector sum of the "lift-force" and "drag-force" components induced by the flow onto the blade develops useful torque about the rotational axis of the turbo-propeller. This torque multiplied by the rotational rate of the propeller provides the mechanical power to drive an electrical generator. As the wind flows over the blades, energy is extracted from the flow. If the blades are oriented in a manner where they attempt to extract too much energy from the flow, the freestream airflow will choose the path of least resistance and will flow around, rather than through, the turbo-propeller. Under this condition, the turbo-propeller stalls; consequently, little mechanical energy can be extracted.

Although propeller type wind powered generators are efficient, they have many shortcomings. Specifically, the lift-to-drag ratio of airfoil sections tends to decline as the Reynolds number of the impinging flow decreases. This tends to limit the efficiency of small turbines. In addition, there is a physical danger of contact associated with the exposed spinning blades—for example, foreign object debris can damage the blades, while moving blades can kill or maim birds, bats, or humans. Finally, the mechanical complexity of the system (which increases the number of moving parts and amplifies cyclical loads) leads to designs which require significant regular maintenance.

The second category of wind power generators includes impeller turbines where the rotational axes of the blades are perpendicular to the oncoming flow. As with the propeller type design, to generate power, the blades rotate at a considerable speed. The blades are oriented so that as the wind flows over the blades, the airfoil section produces lift and drag. The vector sum of the "lift-force" and "drag-force" components induced by the flow onto the blade develops useful torque about the rotational axis of the turbo-propeller.

Such wind turbines typically have flat blades, angled blades, or curved blades, which may or may not be configured in the classical "airfoil" shape. Many such designs feature blades with relatively sharp leading and trailing edges; this characteristic limits the lift-to-drag ratio of the blade in comparison with a classical airfoil shaped blade. In fact, many impeller turbines develop torque primarily from the drag rather than the lift production of the blade elements. Because the ideal lift-to-drag ratio of a properly designed airfoil is quite high (often exceeding 30:1), the efficiency of a drag type wind turbine is lower than a comparable propeller type design. For a drag-based impeller system, many designs concentrate the wind energy by using a conduit with a contracting and diffusing shape ("venturi") mounted ahead of and behind the impeller. However, if the blades are oriented in a manner where they attempt to extract too much energy from the flow, the freestream airflow will choose the path of least resistance and flow around, rather than through, the impeller. Under this condition, the impeller will stall; consequently, little mechanical energy can be extracted.

In contrast to the shortcomings of prior approaches, principles of the present disclosure contemplate a wind power generation system designed to produce electricity from environmental wind at cost effective rates. Exemplary embodiments may be especially useful to mount in areas where there is both a moderate prevailing wind (typically of at least 12 knots) and logistical restrictions that preclude the installation of a conventional wind turbine. Such embodiments may desirably be employed in urban and residential settings. Moreover, multiple units may be located in close proximity to one another, and units may be sized as appropriate to generate differing levels of electrical power.

Figure 2A:
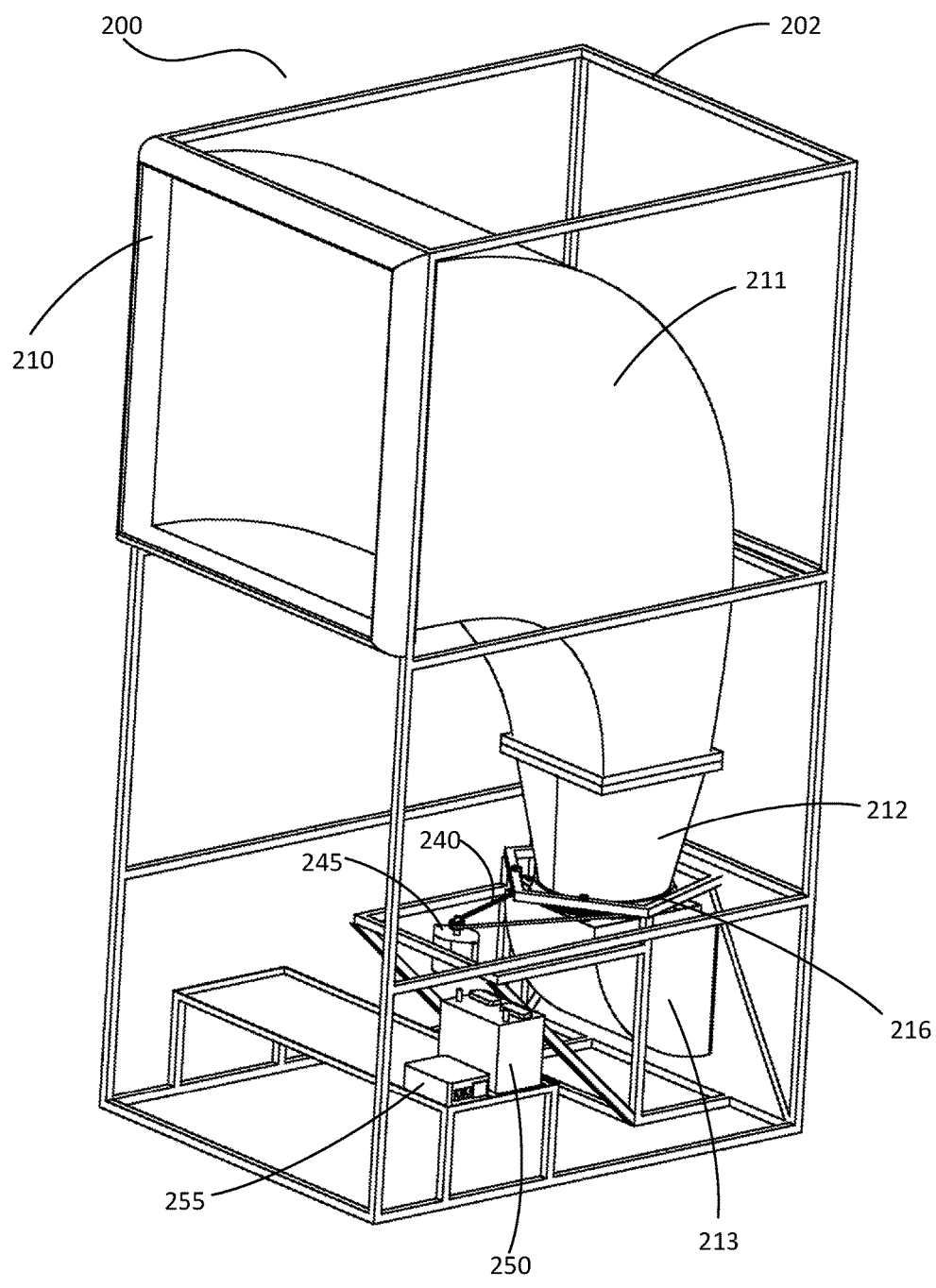
FIGS. 2A-2C illustrate an exemplary wind power generation system in accordance with various exemplary embodiments.
Figure 2C:
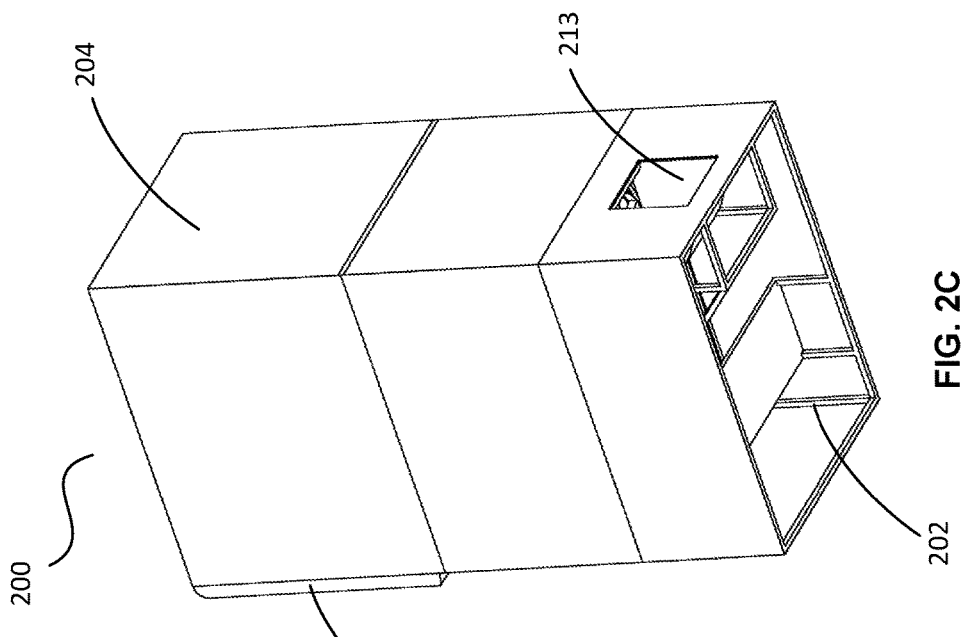
Figure 2B:
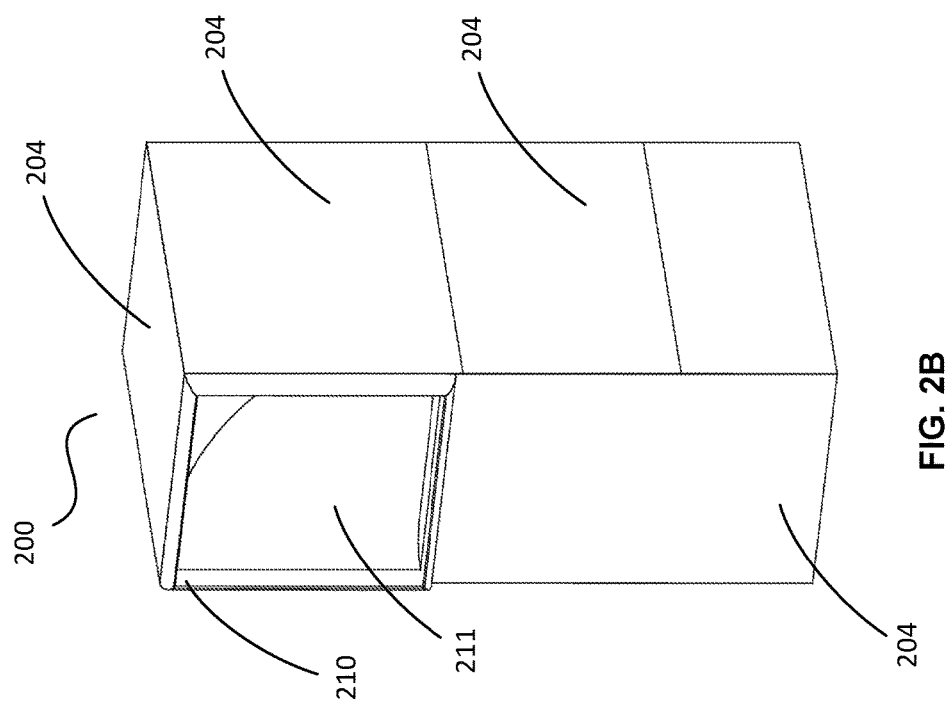

With reference now to FIGS. 2A through 2C, in various exemplary embodiments a wind power generation system 200 is configured to convert wind energy into rotational energy and thereafter into electricity; i.e., wind power generation system 200 is configured to capture ambient wind energy. Various exemplary embodiments comprise an enclosure, an inlet, a contraction, a ducted propeller driving an electrical generator, and an exhaust plenum. In various exemplary embodiments, a ducted propeller is mounted behind an inlet comprising a substantial contraction (for example, between about 5:1 and 20:1) for electrical power generation.

In an exemplary embodiment, wind power generation system 200 comprises frame 202, panels 204, duct 211, adapter 212, propeller 216, and exit plenum 213. Wind power generation system 200 may also comprise generator 245, battery 250, and electrical components 255. Moreover, wind power generation system 200 may comprise any suitable components or systems to facilitate conversion of wind energy into electrical current.

In various exemplary embodiments, freestream airflow enters the intake of wind power generation system 200, is accelerated as it travels down a duct 211, and then interfaces with a propeller 216, for example a ducted propeller. After the airflow imparts energy to the propeller 216, the airflow enters an exit plenum 213 whereby it exits wind power generation system 200 to rejoin the freestream airflow.

In an exemplary embodiment, wind power generation system 200 comprises a frame 202. Frame 202 may comprise aluminum, steel, or other suitable rigid material. Frame 202 is configured to provide mechanical stability and support to other components of wind power generation system 200.

In various exemplary embodiments, wind power generation system 200 comprises a set of panels 204, which may be mounted externally. Panels 204 may comprise sheet metal, plastic, or other suitable rigid material. Panels 204 may be coupled to frame 202 via any suitable components, for example mechanical fasteners. Panels 204 are configured to at least partially conceal the inner components of wind power generation system 200, for example in order to reduce harmful interactions with wildlife, to provide environmental protection to the inner components of wind power generation system 200, and/or to provide an aesthetically pleasing appearance for wind power generation system 200.

Additionally, in various exemplary embodiments, panels 204 at least partially block the freestream airflow, creating a low-static-pressure separated wake flow region on the leeward side of wind power generation system 200. In various exemplary embodiments, wind power generation system 200 is configured to decrease the leeward side wake static pressure by approximately 20% of the stagnation pressure of the incoming airflow on the windward side.

It is well known that Betz's law determines (using mass and momentum conservation principles) the maximum power that can be extracted from the wind, independent of the design of a particular wind turbine. For a conventional open propeller horizontal-axis wind turbine, this value is typically less than 59.3% of the theoretical kinetic energy in the wind. In contrast, via use of panels 204, wind power generation system 200 achieves a wake blockage effect that can enhance the total pressure differential by about 20% over a comparable open propeller design. Accordingly, the Betz limit for an exemplary wind power generation system 200 allows extraction of approximately 70% of the theoretical kinetic energy in the wind (i.e., about 20% more than 59.3%). Stated another way, wind power generation system 200 may be configured to achieve extraction of more kinetic energy from wind than is possible for a conventional open propeller horizontal-axis wind turbine to achieve, even if such conventional turbine operated with perfect efficiency.

In this manner, wind power generation system 200 can exploit the difference in total pressure between (i) the oncoming windward side airflow entering duct 211, and (ii) the exit plenum 213 airflow which exhausts into the separated wake flow behind wind power generation system 200. This enhanced pressure differential allows wind power generation system 200 to extract more energy from the airflow than a conventional propeller-type wind power generation system (for example, prior system 100). Other suitable components (for example, flanges, fins, and/or the like) configured to at least partially block the freestream airflow may be utilized in wind power generation system 200.

In certain exemplary embodiments, wind power generation system 200 comprises one or more of an electrical generator 245, a battery or batteries 250, and electrical input/output control components 255. In this manner, wind power generation system 200 may supply a regulated and/or controlled electrical output, for example suitable for linking to an electrical grid.

Figure 3A:
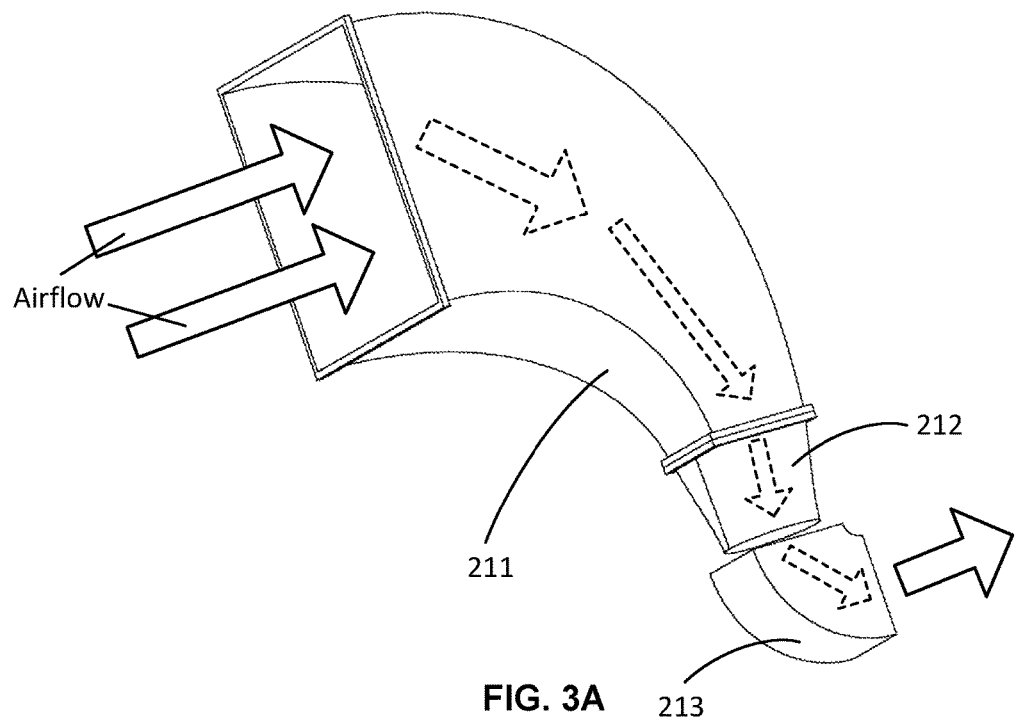
FIG. 3A illustrates the flow path of an exemplary wind power generation system in accordance with an exemplary embodiment.
Figure 3B:
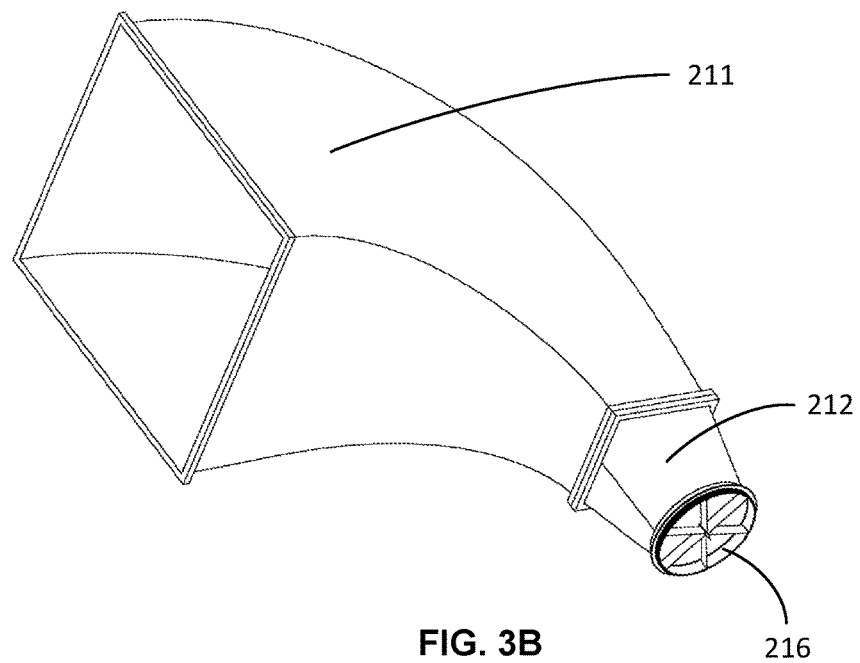
FIG. 3B illustrates components of an exemplary wind power generation system in accordance with an exemplary embodiment.

With reference now to FIGS. 2A, 3A, and 3B, in an exemplary embodiment wind power generation system 200 comprises a duct 211 coupled to an adapter 212. At the intake side of duct 211 is leading edge 210. Leading edge 210 is shaped to accept airflow over a wide range of flow angles with minimum separation and pressure losses. Duct 211, adapter 212, and leading edge 210 may comprise any suitable rigid and/or strong material, for example sheet metal, plastic, and/or the like. In some embodiments, duct 211 and adapter 212 may be a single component.

In certain exemplary embodiments, the geometry of duct 211 and adapter 212 are shaped to accelerate the airflow and direct it into propeller 216. Because the unit Reynolds number of airflow at sea level is approximately 900 per inch*knot, a 10:1 inlet contraction applied to a 15 knot prevailing wind speed will produce an exit flow with an airspeed of 150 knots and, consequently, airflow impinging upon a propeller 216 at a unit Reynolds number of 135,000 per inch. Thus, propeller 216 blades with a mean chord of three inches will experience flow at a Reynolds number of at least 405,000. This high Reynolds number flow is desirable for use in connection with propeller 216 configurations utilizing principles of airplane propeller design.

Duct 211 may be designed to efficiently capture, accelerate and/or turn the incoming airflow. A blunt shape for leading edge 210, for example a bullnose, can capture an inbound stream of air over an included angle range of at least +/−15 degrees with minimal losses. For operation in areas with strong prevailing winds, this can allow for a fixed mounting of wind power generation system 200. Moreover, for operation in areas with variable winds, wind power generation system 200 may be re-orientable, for example by mounting on a turntable engineered to orient the duct 211 broadly into the wind.

Suitable contouring of duct 211 can lead to a compact shaping with negligible losses. The choice of the inlet contraction ratio may be influenced by the design output of the wind turbine system. The choice of the inlet contraction ratio may be made to match the prevailing freestream wind speed to a fast, but not transonic, axial flow velocity at the inlet plane of propeller 216. In various exemplary embodiments, the inlet/contraction geometry of duct 211 is configured with a contraction ratio of between about 5:1 and about 20:1. For example, a 10:1 contraction would convert a 15 knot freestream velocity to a 150 knot flow at propeller 216. Conversely, a 15:1 contraction would convert a 10 knot freestream velocity to the same 150 knot flow at propeller 216.

Thus, by matching different sized ducts 211 and/or overall outer dimensions of wind speed generation system 200 with differing contraction ratios to the same propeller 216, an exemplary wind power generation system 200 may be "tuned" to the prevailing winds at a specific site. Stated another way, based on one or more constraints, for example prevailing winds, building codes, available space for wind speed generation system 200, noise restrictions, bill of materials costs, and/or the like, wind speed generation system 200 may be customized for desirable operation at a particular location in accordance with principles of the present disclosure. Duct 211 can be designed "straight through", or can be engineered to significantly turn the incoming airflow, if desired, for example as illustrated in FIGS. 3A and 3B.

In various exemplary embodiments, propeller 216 is mounted behind adapter 212 and ahead of exit plenum 213. In an exemplary embodiment of wind power generation system 200, propeller 216 is mounted so that its rotational axis is parallel to the incoming wind flow. However, in various exemplary embodiments, propeller 216 may be mounted at any suitable angle to the incoming airflow, as desired.

Propeller 216 is designed to operate at a high efficiency due to the contraction imparted by the geometry of duct 211 and adapter 212 and resulting higher Reynolds number flow at propeller 216. Stated another way, the Reynolds number at the inlet side of duct 211 is lower than the Reynolds number at propeller 216. Because the total torque developed by propeller 216 is proportional to the lift forces produced by the inclined blades, and the force produced by the blades is proportional to the square of the flow velocity and the linear length and chord of the blade, in various exemplary embodiments, a wind power generation system 200 configured with a 10:1 contraction in accordance with principles of the present disclosure may utilize a rotor as small as 31.6% (i.e., the reciprocal of the square root of the contraction ratio; in this instance, the square root of 10) of the diameter of a conventional propeller type wind turbine or even smaller.

In various exemplary embodiments, an exemplary propeller 216 configured for use in wind power generation system 200 configured with a 10:1 contraction will have a wetted area about 31.6% of the wetted area of an equivalent conventional propeller having an equivalent swept area. In wind power generation system 200, the dynamic pressure of the incoming flow going over an exemplary propeller 216 may be 100 times (or even higher) than that of a conventional propeller (a 5:1 contraction results in approx. 25× dynamic pressure increase, a 10:1 contraction results in approx. 100× dynamic pressure increase, a 15:1 contraction results in approx. 225× dynamic pressure increase, and so forth). These factors contribute to exemplary wind power generation system 200 being able to extract the same amount of energy (or even more energy) from an incoming flow with a propeller 216 comprising substantially less wetted area than that of an equivalent conventional wind turbine.

In various exemplary embodiments, the total drag of the airfoil section is proportional to lift, the wetted area of propeller 216 blades and to the skin friction coefficient of the airflow as it passes over the wetted surface area. At the Reynolds numbers of interest, the flat plate skin friction coefficient (Cf) may be predicted by Blasius' equation:

$$Cf = (0.664/(Re)^{1/2})$$

Therefore, in an exemplary embodiment where duct 211 and adapter 212 provide a 10:1 contraction, as exemplary flow is accelerated from a Reynolds number of 40,500 to 405,000, the flat plate skin friction of the airflow reduces by a factor of 3.162. This is a significant boost to wind power generation system 200 performance, because the losses due to air flow scrubbing over propeller 216 blades represent a source of approximately one half of the total losses in wind power generation system 200.

Figure 3C:
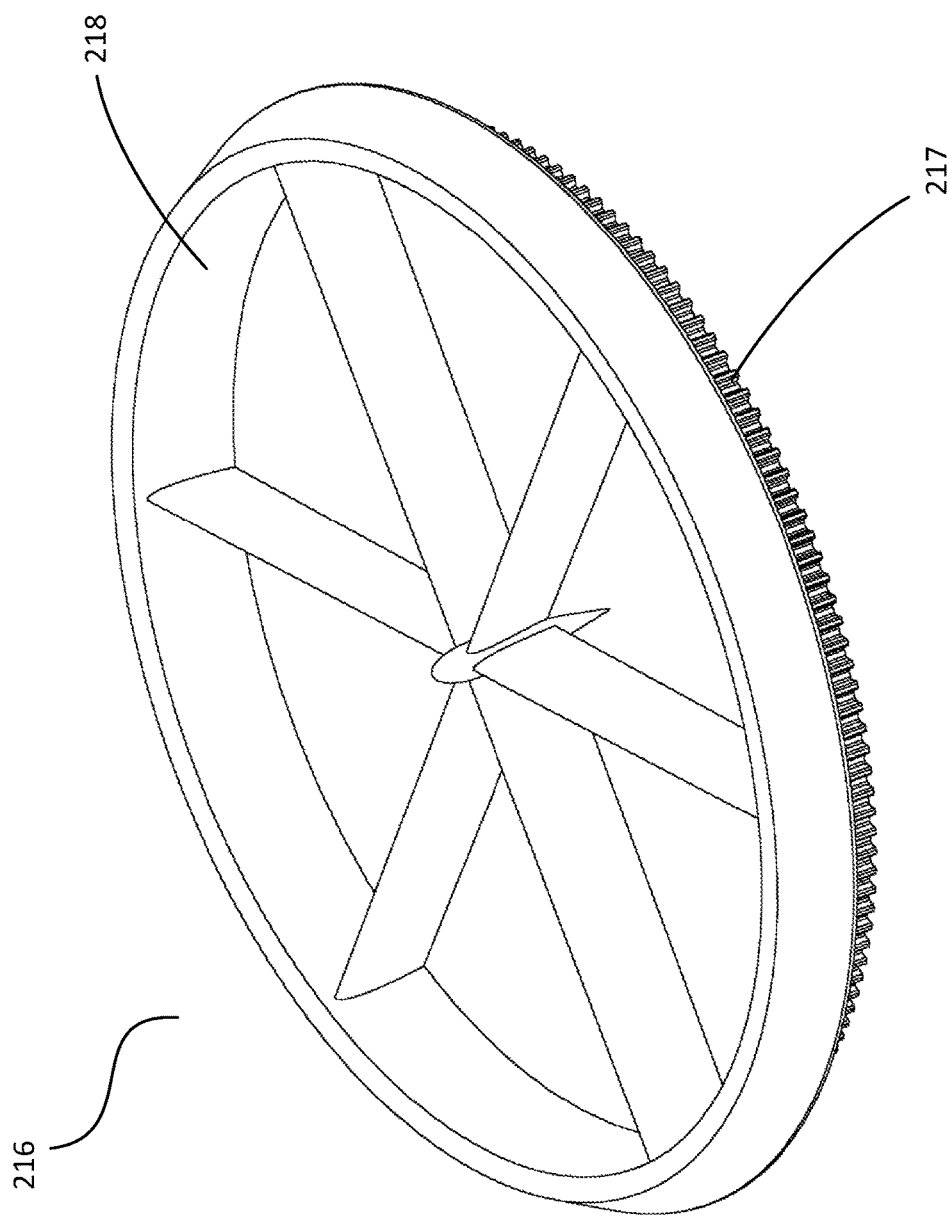
FIG. 3C illustrates a turbo-propeller of an exemplary wind power generation system in accordance with an exemplary embodiment.

With reference now to FIG. 3C, in various exemplary embodiments, propeller 216 may be configured as a turbo-propeller. Propeller 216 may be contoured to maximize aerodynamic efficiency. In addition, the design of propeller 216 differs substantially from design principles of conventional propellers. Specifically, propeller 216 is configured for maximum efficiency at a rotational speed where the radial velocity of the propeller blade is slower than the velocity of the inflow air; stated another way, during operation of wind power generation system 200, the radial velocity of the propeller blade is smaller than the axial velocity of the inflow air at all locations on the propeller blade. This is at odds with conventional windmill, propeller, or helicopter design, where the blades are configured for maximum efficiency at a rotational speed where the airflow over the blade is dominated by the radial velocity of the blade.

Accordingly, in various exemplary embodiments suitably sized for residential use, propeller 216 is configured with between 2 blades and 8 blades. Moreover, propeller 216 may be configured with a rotor diameter of between about 10 inches and about 18 inches. Additionally, propeller 216 may be configured with a blade chord length of between about 1 inch and about 2 inches. In an exemplary embodiment sized for residential use, propeller 216 is configured with 6 blades, a rotor diameter of about 12 inches, and a blade chord length of about 1.5 inches. In an exemplary embodiment, propeller 216 produces about 48 foot-pounds of torque at 360 RPM. It will be appreciated that propeller 216 may be configured, scaled, and/or sized appropriately for a desired application, for example by varying the rotor diameter, number of blades, blade chord length, and so forth. For example, in exemplary embodiments sized for commercial use, propeller 216 may be configured with a rotor diameter exceeding 18 inches, for example a rotor diameter of up to 36 inches.

In various exemplary embodiments, wind power generation system 200 is configured to achieve operation in connection with airflow at a Reynolds number of at least 100,000 at propeller 216. In other exemplary embodiments, wind power generation system 200 is configured to achieve operation in connection with airflow at a Reynolds number of at least 200,000 at propeller 216. In some exemplary embodiments, wind power generation system 200 is configured to achieve operation in connection with airflow at a Reynolds number of between about 300,000 and about 700,000 at propeller 216.

In accordance with principles of the present disclosure, wind power generation system 200 implements the realization that a propeller 216 having a fixed pitch desirably would not just efficiently transform wind energy into mechanical energy at one specific design flow rate and rotor speed, but would desirably produce a consistent positive torque to drive a generator across a wide variety of flow speeds and rotor speeds. Propeller 216, with blades subtly twisted and oriented "into the wind" rather than "tangent to the wind", develops a relatively consistent torque across a wide variety of angular speeds. The torque output is largely proportional to the square of the incoming wind speed (ranging from zero in still air through a maximum under severe gust conditions where the flow in the contraction portion of duct 211 would begin to "choke" due to compressibility effects).

In various exemplary embodiments, because propeller 216 may rotate at a slower speed than the functional speed of common electrical power generators, an overall speed step-up (rather than step-down) mechanism may be utilized to transfer mechanical power from propeller 216 to a generator. In some exemplary embodiments, a step-up gear ratio of between about 2:1 and about 20:1 may be utilized. Moreover, any suitable gear ratio may be utilized between propeller 216 and an electrical power generator in order to provide a suitable rotational speed input to the electrical power generator.

In various exemplary embodiments, in order to facilitate assembly of propeller 216 into wind power generation system 200, propeller 216 may be configured with an outer ring 218. Outer ring 218 may provide a suitable interface to bearings and/or power transmission components; moreover, outer ring 218 allows for a novel mounting system, such as a three-point mounting system, to be utilized with propeller 216. Additionally, propeller 216 may be configured with teeth 217 for interfacing with a belt drive utilizing belt 240.

Figure 4A:
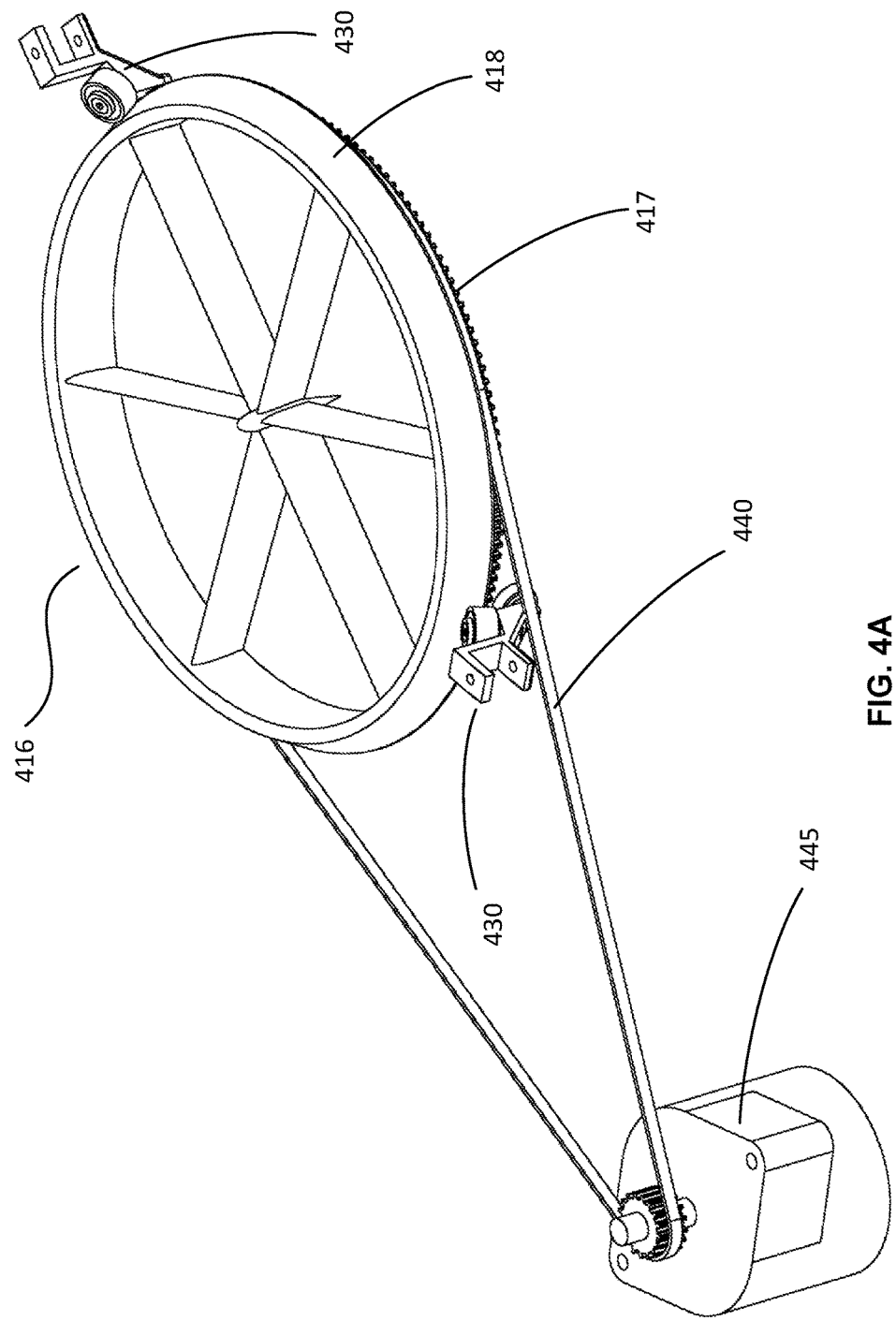
FIG. 4A illustrates power generation and/or transmission components of an exemplary wind power generation system in accordance with an exemplary embodiment.
Figure 4B:
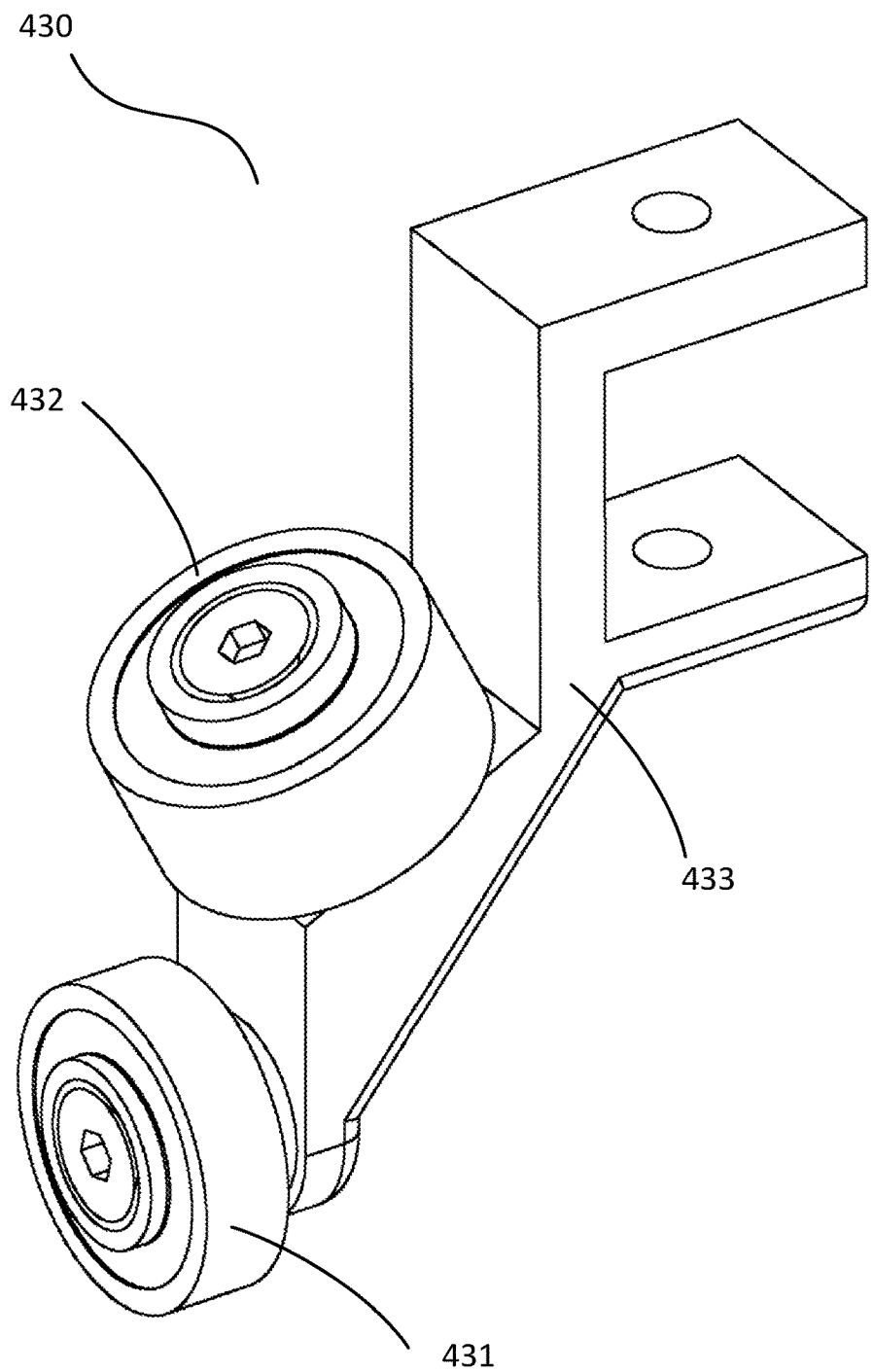
FIGS. 4B and 4C illustrate guidance assemblies of an exemplary wind power generation system in accordance with an exemplary embodiment.
Figure 4C:
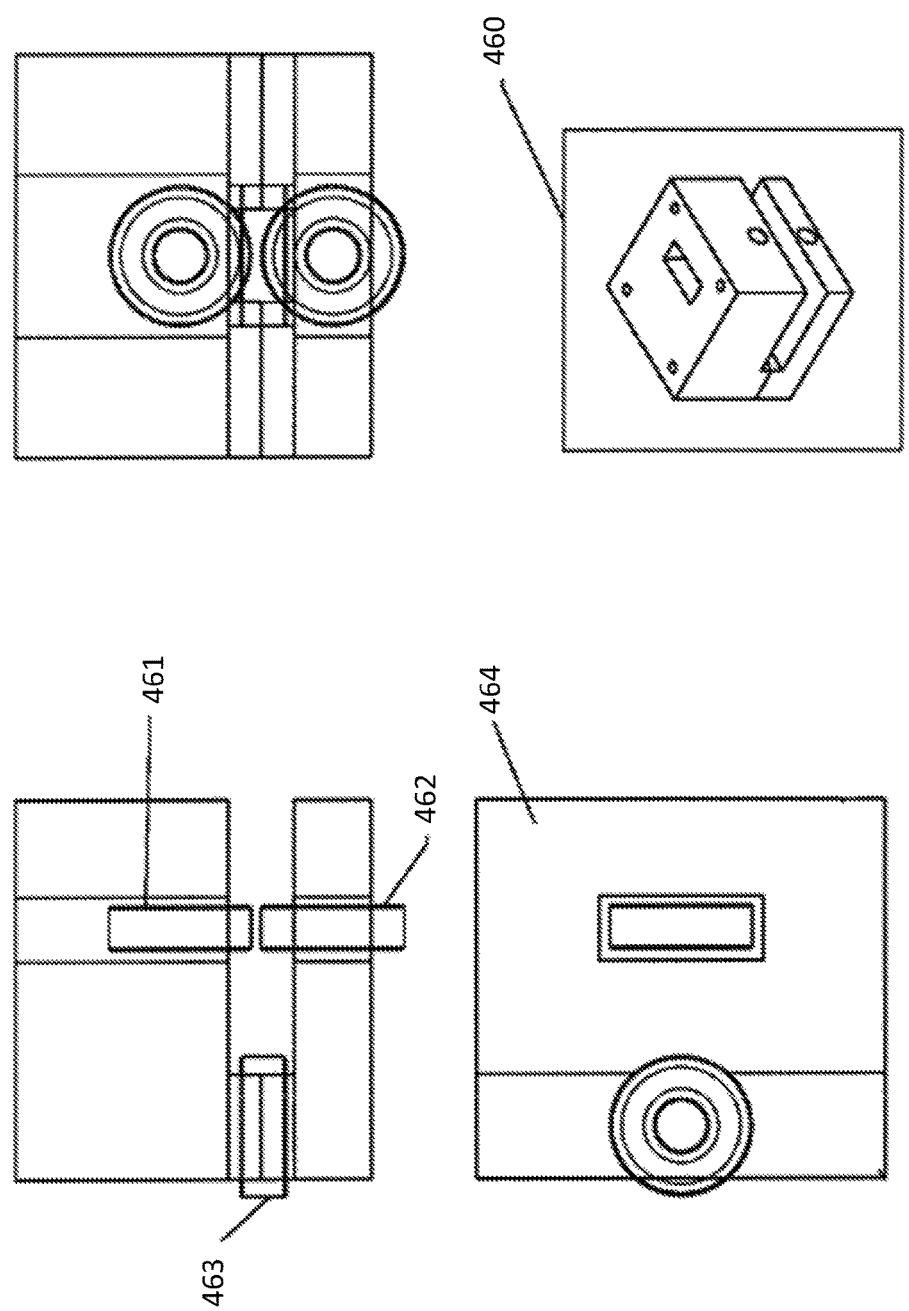

In various exemplary embodiments, with reference now to FIGS. 4A-4C, a belt drive arrangement may be utilized between a propeller 416 and an electrical power generator. In certain exemplary embodiments, propeller 416 "rim-drives" rather than "shaft-drives" or "hub-drives" a power generation component, for example a generator 445. Propeller 416 may be configured with teeth 417 to function as a driving pulley for a belt 440 to rotate generator 445. Propeller 416 may be affixed to other components of wind power generation system 200 in a suitable manner, for example through three or more bearing assemblies 430 and/or 460.

With momentary reference to FIG. 4B, in an exemplary embodiment, bearing assemblies 430 comprise two wheels 431, 432 affixed to a substructure 433. Wheels 431, 432 are configured to contact propeller 416. Wheels 431 and 432 are free to spin about their respective principal axes of rotation. Wheels 431 and 432 provide thrust plane position and radial plane position control for propeller 416.

Turning now to FIG. 4C, in various exemplary embodiments a bearing assembly 460 comprises three wheels 461, 462, 463 affixed to substructure 464 and configured to contact propeller 416. Each wheel 461, 462, 463 is free to spin about its principal axis of rotation. Wheels 461 and 462 provide thrust plane location for propeller 416. Wheel 463 provides radial plane position control for propeller 416.

The bearing assemblies 460 may be mounted to fixed substructure of wind power generation system 200 in any suitable manner, for example using a plurality of fasteners to couple to frame 202. When three or more bearing assemblies 460 are used to locate propeller 416, propeller 416 is prevented from translating fore-aft, left-right, and up-down, but can rotate freely so that it can turn generator 445. It will be appreciated that various alternative bearing and/or stabilization approaches may be employed, consistent with principles of the present disclosure.

Figure 5:
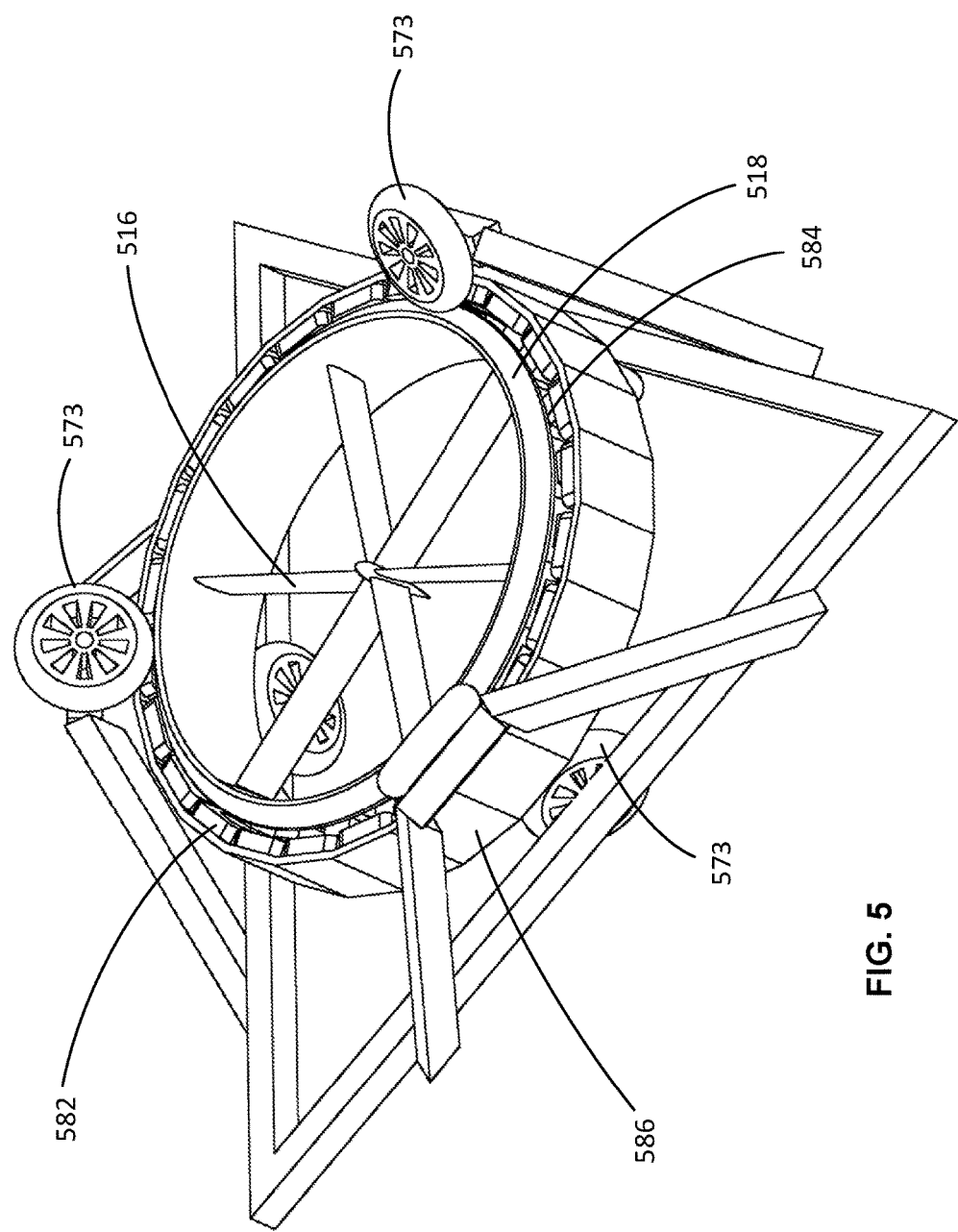
FIG. 5 illustrates power generation and/or transmission components of an exemplary wind power generation system in accordance with an exemplary embodiment.

Turning now to FIG. 5, in various exemplary embodiments, wind power generation system 200 may be configured whereby a propeller, for example propeller 516, shares a common rotational axis with power generation components, for example a permanent magnet electrical generator. In these exemplary embodiments, propeller 516 may comprise an outer ring 518 configured to hold a series of permanent magnets 584. In this manner, the outer portion of propeller 516 may serve as a rotor in an electrical generator. Responsive to rotation of propeller 516, the magnetic flux of permanent magnets 584 interacts with a stator comprising electrical coil assemblies 586 (each comprising a coil 582) to convert mechanical energy into electrical current. In these exemplary embodiments, magnets 584 may be disposed along the outer portion of propeller 516, for example via mounting to outer ring 518.

In wind power generation system 200, an electrical generator may be configured as a radial flux machine and/or as a transverse flux machine. In various exemplary embodiments, propeller 516 may be configured with any suitable number and/or size of magnets 584, as desired, for example in order to generate a desired current responsive to rotation of propeller 516; stated another way, propeller 516 may be configured with a selected number of poles and/or otherwise configured to generate electrical current having a particular voltage, frequency, and so forth. It will be appreciated that the target rotational speed of propeller 516 under particular ambient conditions may be utilized in order to select the configuration of magnets 584 and/or corresponding stator components in an electrical generator.

Continuing to reference FIG. 5, in various exemplary embodiments, outer ring 518 locates propeller 516, for example via interaction with three or more bearings 573, in order to provide radial and axial thrust positioning control as discussed hereinabove. Bearings 573 may comprise any suitable components in order to allow propeller 516 to spin freely. In one exemplary embodiment, bearings 573 comprise components similar to an in-line skate wheel and are configured similarly thereto. In an exemplary embodiment, wind power generation system 200 comprises six bearings 573, three disposed generally on a first side of outer ring 518, and three disposed generally on a second side of outer ring 518. However, any suitable number and positioning of bearings 573 may be employed.

In accordance with principles of the present disclosure, a wind power generation system 200 configured with exemplary guidance and support components for a propeller (for example, propeller 216, 416, and/or 516) avoids a conventional central shaft and bearing arrangement. Accordingly, wind power generation system 200 is structurally efficient and has no supporting structure to cause the sort of wake interaction problems that lead to the cyclic loading that conventional wind turbines exhibit. Consequently, in wind power generation system 200, vibration tendencies may be reduced and/or eliminated. In addition, the mechanical design is simpler than other approaches; the system has very few moving parts. In certain exemplary embodiments, propeller 216 is coupled to generator 445 via a belt drive (an efficient mechanism that further damps out vibrations). Moreover, in many exemplary embodiments, generator 445 is mounted to a fixed base, so there is little need to incorporate complex flexible electrical power conduits into wind power generation system 200.

Accordingly, unlike current residential wind power approaches, where a "wind mill" must be raised upon a tower, exemplary wind power generation systems configured in accordance with principles of the present disclosure feature innocuous industrial design with no externally visible moving parts, enhancing both aesthetics and safety. The simplicity of the mechanisms and straightforward mechanical design principles can make the acquisition cost of an exemplary system, for example wind power generation system 200, competitive to the end user even without government subsidy.

It will be appreciated that exemplary wind power generation systems provide a complimentary alternative to residential solar panels to provide renewable electrical power generation. Exemplary wind power generation systems permit an industrial or residential customer to generate electricity from wind through a device that has no visible moving parts. Moreover, exemplary wind power generation systems can be mounted in a relatively aesthetic enclosure, suitable for deployment into residentially zoned areas.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

What is claimed is:

1. A wind power generation system, comprising:
an enclosure configured with an airflow inlet and an airflow exit, wherein the airflow inlet is configured with a contraction ratio of at least 5:1; and
a propeller disposed between the airflow inlet and the airflow exit, wherein the propeller is configured to extract mechanical energy from airflow captured by the inlet,
wherein the airflow exit is configured to vent air which has passed over the propeller out of the enclosure,
wherein the propeller is coupled to three or more bearing assemblies, and
wherein each bearing assembly is configured to hold the propeller in positional space, but allow the propeller to spin freely.

2. The wind power generation system of claim 1, wherein the effective airflow velocity over the propeller is dominated by the axial flow of the airflow supplied by the airflow inlet.

3. The wind power generation system of claim 1, further comprising an electrical generator coupled to the propeller via a belt drive.

4. The wind power generation system of claim 3, wherein a step-up gear ratio between the propeller and the electrical generator is between 1:1 and 1:20.

5. The wind power generation system of claim 1, further comprising an electrical generator, wherein the propeller and the electrical generator share a common rotational axis.

6. The wind power generation system of claim 5, wherein a magnet and a coil of the electrical generator are disposed about an outer portion of the propeller.

7. The wind power generation system of claim 6, wherein the electrical generator is a transverse flux machine.

8. The wind power generation system of claim 1, wherein the airflow through the propeller is enhanced by the pressure differential between the freestream windward facing inlet and the leeward side separated wake flow region behind the enclosure.

9. The wind power generation system of claim 1, wherein the airflow inlet is configured with a contraction ratio greater than 10:1.

10. The wind power generation system of claim 1, wherein the propeller is not mounted on a central shaft.

11. The wind power generation system of claim 1, wherein the enclosure is mounted on a turntable to enable the wind power generation system to face into oncoming airflow.

12. The wind power generation system of claim 1, wherein, during operation of the wind power generation system, incoming airflow impinges on the propeller at a unit Reynolds number exceeding 100,000 per inch.

13. The wind power generation system of claim 1, wherein the system is configured with a Betz limit of between 60% and 70%.

14. A wind power generation system; comprising:
an inlet comprising a leading edge at a first end of the inlet;
a propeller;
an adapter connected between a first side of the propeller and a second end of the inlet; and
an exit plenum connected to a second side of the propeller,
wherein the wind power generation system is configured with a contraction ratio, as measured between the first end of the inlet and the first side of the propeller, of at least 5:1,
wherein the propeller is coupled to three or more bearing assemblies, and
wherein each bearing assembly is configured to hold the propeller in positional space, but allow the propeller to spin freely.

15. The wind power generation system of claim 14, further comprising an electrical generator,
wherein the propeller and the electrical generator share a common rotational axis,
wherein a magnet and a coil of the electrical generator are disposed about an outer portion of the propeller, and
wherein the electrical generator is a transverse flux machine.

16. A wind power generation system, comprising:
an enclosure configured with an airflow inlet and an airflow exit, wherein the airflow inlet is configured with a contraction ratio of at least 5:1;
a propeller disposed between the airflow inlet and the airflow exit, wherein the propeller is configured to extract mechanical energy from airflow captured by the inlet; and
an electrical generator,
wherein the airflow exit is configured to vent air which has passed over the propeller out of the enclosure,
wherein the propeller and the electrical generator share a common rotational axis,
wherein a magnet and a coil of the electrical generator are disposed about an outer portion of the propeller, and
wherein the electrical generator is a transverse flux machine.

17. The wind power generation system of claim 16, wherein the propeller is not mounted on a central shaft.

18. The wind power generation system of claim 16, wherein the system is configured with a Betz limit of between 60% and 70%.

\* \* \* \* \*